US008886165B2

(12) United States Patent
Kwon et al.

(10) Patent No.: US 8,886,165 B2
(45) Date of Patent: Nov. 11, 2014

(54) APPARATUS AND METHOD FOR MANAGING APPLICATION IN WIRELESS TERMINAL

(75) Inventors: Se-Hong Kwon, Busan (KR); Don-Gyo Jun, Gyeongsangbuk-do (KR); Soon-Shik Hwang, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/404,806

(22) Filed: Feb. 24, 2012

(65) Prior Publication Data

US 2013/0052993 A1    Feb. 28, 2013

(30) Foreign Application Priority Data

Aug. 30, 2011 (KR) .................. 10-2011-0087304

(51) Int. Cl.
| | |
|---|---|
| *H04W 12/06* | (2009.01) |
| *G06F 21/36* | (2013.01) |
| *G06F 21/45* | (2013.01) |
| *G06F 21/46* | (2013.01) |
| *G06F 21/74* | (2013.01) |

(52) U.S. Cl.
CPC .............. *G06F 21/36* (2013.01); *G06F 21/45* (2013.01); *G06F 21/46* (2013.01); *G06F 21/74* (2013.01); *G06F 2221/2105* (2013.01); *G06F 2221/2113* (2013.01); *G06F 2221/2117* (2013.01); *G06F 2221/2147* (2013.01)
USPC .............................. 455/411; 345/173; 726/19

(58) Field of Classification Search
USPC ........ 455/410–411, 414.1–414.4, 418, 552.1, 455/556.1–557, 565, 566; 345/156–184
See application file for complete search history.

(56) References Cited

U.S. PATENT DOCUMENTS

| | | | |
|---|---|---|---|
| 2003/0163811 | A1 | 8/2003 | Luehrs |
| 2004/0236508 | A1 | 11/2004 | Ogasawara |
| 2005/0097563 | A1 | 5/2005 | Bidet et al. |
| 2007/0011461 | A1 | 1/2007 | Jeng |
| 2008/0263643 | A1 | 10/2008 | Jaiswal et al. |
| 2010/0138914 | A1* | 6/2010 | Davis et al. ..................... 726/19 |
| 2010/0199100 | A1 | 8/2010 | Goertzen |
| 2011/0316797 | A1* | 12/2011 | Johansson ..................... 345/173 |
| 2012/0054057 | A1 | 3/2012 | O'Connell et al. |
| 2012/0066650 | A1 | 3/2012 | Tirpak et al. |
| 2012/0081282 | A1* | 4/2012 | Chin ............................ 345/156 |
| 2012/0151400 | A1 | 6/2012 | Hong et al. |
| 2012/0311499 | A1* | 12/2012 | Dellinger et al. ............ 715/835 |
| 2013/0093707 | A1 | 4/2013 | Park et al. |
| 2013/0318598 | A1 | 11/2013 | Meacham |

(Continued)

FOREIGN PATENT DOCUMENTS

| | | |
|---|---|---|
| EP | 1 816 580 A1 | 8/2007 |
| KR | 10-0496954 B1 | 6/2005 |
| WO | 2004/046925 A1 | 6/2004 |
| WO | WO 2010040670 A2 * | 4/2010 |

*Primary Examiner* — Kashif Siddiqui
(74) *Attorney, Agent, or Firm* — Cha & Reiter, LLC

(57) ABSTRACT

Provided is an apparatus and method for managing an application in a wireless terminal, in which data of an application is managed and displayed according to an input type of a password for unlocking the wireless terminal, wherein the apparatus includes a memory for storing a plurality of passwords and a controller for classifying and managing data of each of a plurality of applications according to a password type.

12 Claims, 4 Drawing Sheets

(56) References Cited

U.S. PATENT DOCUMENTS

| | | |
|---|---|---|
| 2013/0333020 A1 | 12/2013 | Deshpande |
| 2014/0040943 A1 | 2/2014 | Knowles et al. |
| 2014/0075552 A1 | 3/2014 | Guriappa Srinivas et al. |
| 2014/0143844 A1 | 5/2014 | Goertzen |

* cited by examiner

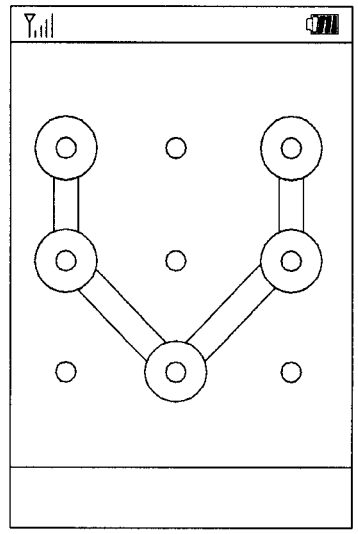
FIG.4A  FIG.4B
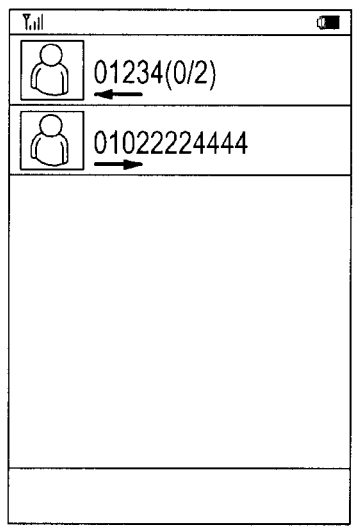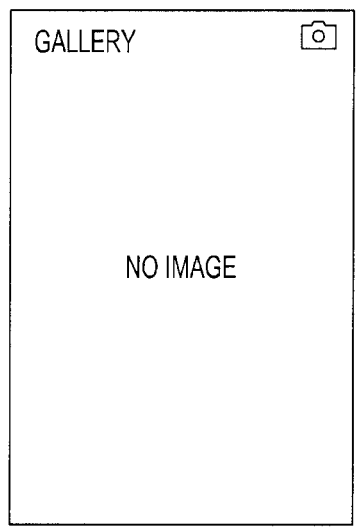
FIG.4C  FIG.4D

APPARATUS AND METHOD FOR MANAGING APPLICATION IN WIRELESS TERMINAL

CLAIM OF PRIORITY

This application claims the benefit under 35 U.S.C. §119 of a Korean Patent Application filed in the Korean Intellectual Property Office on Aug. 30, 2011 and assigned Serial No. 10-2011-0087304, the entire disclosure of which is hereby incorporated by reference.

BACKGROUND OF THE INVENTION

1. Field of the Invention

The present invention relates to an apparatus and method for managing an application in a wireless terminal.

2. Description of the Related Art

To protect private information, a password is generally used in a wireless terminal. The password used in the wireless terminal, however, merely unlocks the wireless terminal.

Moreover, the wireless terminal can store only one password and does not provide a function of distinguishing a user or managing data using the password.

SUMMARY OF THE INVENTION

Accordingly, an aspect of the present invention is to provide an apparatus and method for managing an application of a wireless terminal, in which data of an application is managed according to a type of a password for unlocking the wireless terminal.

According to an aspect of the present invention, an apparatus for managing an application in a wireless terminal includes a memory for storing a plurality of passwords, and a controller for classifying and managing data of each of a plurality of applications according to a type of a password.

According to another aspect of the present invention, a method for managing an application in a wireless terminal includes inputting a particular password for unlocking the wireless terminal, and if the input particular password is included in a plurality of preset passwords, classifying and managing each of a plurality of applications according to a type of the input particular password.

BRIEF DESCRIPTION OF THE DRAWINGS

The above and other features and advantages of an exemplary embodiment of the present invention will be more apparent from the following detailed description taken in conjunction with the accompanying drawings, in which:

FIGS. 3A through 4D are diagrams for describing an operation of managing an application in a wireless terminal according to an embodiment of the present invention.

DETAILED DESCRIPTION

Figure 1:
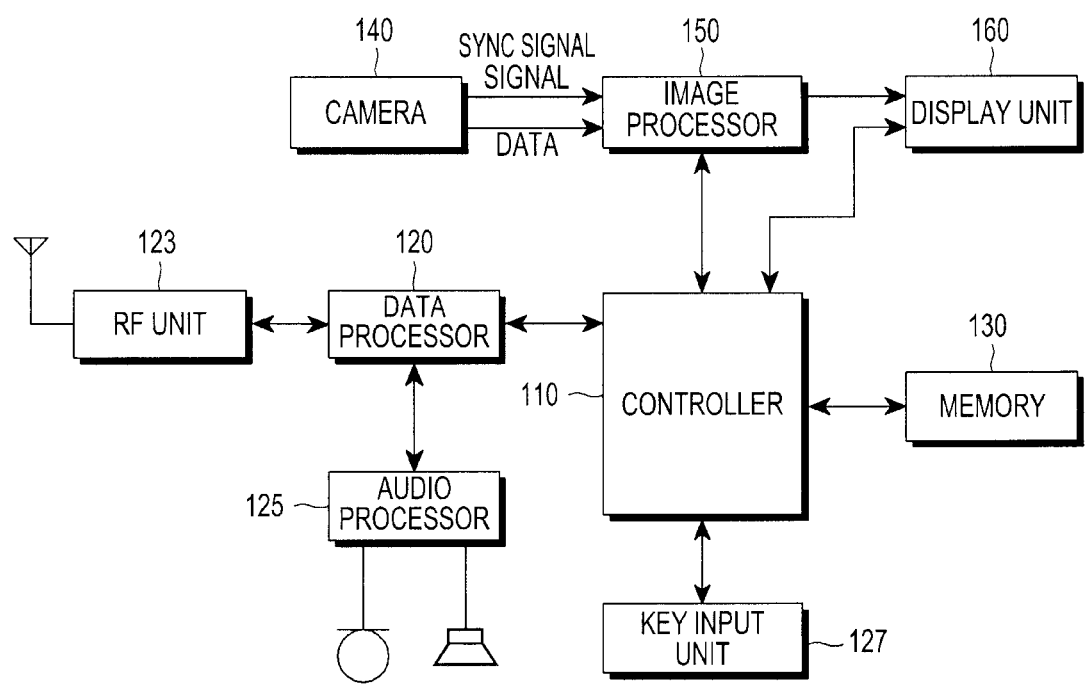
FIG. 1 is a block diagram of a wireless terminal according to an embodiment of the present invention.

Hereinafter, an exemplary embodiment of the present invention will be described in detail with reference to the accompanying drawings. It should be noted that identical reference numerals refer to identical components throughout the drawings.

FIG. 1 is a block diagram of a wireless terminal according to an embodiment of the present invention.

Referring to FIG. 1, a Radio Frequency (RF) unit 123 performs a wireless communication function of the wireless terminal. The RF unit 123 includes an RF transmitter for up-converting a frequency of a transmission signal and amplifying the transmitted signal and an RF receiver for low-noise amplifying a received signal and down-converting the frequency of the received signal. A data processor 120 includes a transmitter for encoding and modulating the transmission signal and a receiver for demodulating and decoding the received signal. The data processor 120 may include a modem and a codec. Herein, the codec includes a data codec for processing packet data and an audio codec for processing an audio signal such as voice. An audio processor 125 reproduces an audio signal being output from the audio codec of the data processor 120 or transmits an audio signal generated from a microphone to the audio codec of the data processor 120.

A key input unit 127 includes keys for inputting numeric and character information and function keys for setting various functions.

A memory 130 includes program and data memories. The program memory stores programs for controlling a general operation of the wireless terminal and a program for individually managing data of a plurality of applications according to a type of a password for unlocking the wireless terminal according to an embodiment of the present invention. The data memory also temporarily stores data generated during execution of the programs.

According to an embodiment of the present invention, the memory 130 stores a plurality of passwords which are preset by a user, such that data corresponding each of a plurality of applications stored in the wireless terminal can be classified and managed using these passwords. That is, the passwords are used to unlock the wireless terminal, such as unlocking patterns or unlocking numbers. The plurality of passwords includes at least one password for classifying and managing data corresponding to each of the plurality of applications, and/or at least one password for collectively managing data of each of the plurality of applications. That is, the invention provides classifying and managing data of each of the plurality of applications by a particular password, or collectively managing (i.e., not dividing) data of each of the plurality of applications by a particular password. Here, the plurality of applications includes all applications executed in the wireless terminal, such as a phone directory application, a message application, an album application, recent records, etc., and the data may include prestored data or currently generated data for a subsequent retrieval, as explained later with reference to FIGS. 3 and 4.

The controller 110 controls the overall operation of the wireless terminal.

According to an embodiment of the present invention, the controller 110 classifies and manages data of each of the plurality of applications stored in the wireless terminal according to a type of a password.

According to an embodiment of the present invention, when a password input during a locking state of the wireless terminal is included in the plurality of preset passwords, the controller 110 classifies and manages data of each of the plurality of applications according to a type of the input password. The preset passwords may include predetermined patterns and/or predetermined numbers for unlocking the wireless terminal.

According to an embodiment of the present invention, when a particular password input during a locking state of the wireless terminal is included in the plurality of preset passwords, the controller 110 unlocks the password and switches the wireless terminal to a mode corresponding to the input particular password (or particular-password mode). When a data view menu for an application among the plurality of applications is selected in the particular-password mode, the controller 110 displays only a certain data, stored in the particular-password mode. To this end, the controller 110 classifies data in which key values of the particular-password mode are stored, out of all data of the applications, as the data stored in the particular-password mode and displays the corresponding classified data. That is, when a particular-password is input, any data including the key values of the particular-password is retrieved for display.

Further, when data executed in the selected application is generating during the particular-password mode, the controller 110 classifies the executed data as data of the particular-password mode and stores the executed or generated data as the data of the particular-password mode by assigning key values corresponding to the particular-password mode to the newly executed or generated data. That is, the controller 110 stores the key values of the particular-password mode in the data executed in the selected application, thereby classifying the data for a subsequent retrieval as the data of the particular-password mode.

A camera unit 140 captures an image, and may include a camera sensor for converting an optical signal of the captured image into an electrical signal, and a signal processor for converting an analog image signal of the image captured by the camera sensor into digital data. Herein, it is assumed that the camera sensor is a Charge Coupled Device (CCD) sensor or a Complementary Metal Oxide Semiconductor (CMOS) sensor, and the signal processor may be implemented as a Digital Signal Processor (DSP). In addition, the camera sensor and the signal processor may be implemented as one piece or separately.

An image processor 150 performs Image Signal Processing (ISP) to display an image signal output from the camera unit 140 on the display unit 160. The ISP executes functions such as gamma correction, interpolation, space conversion, image effect, image scale, Auto White Balance (AWB), Auto Exposure (AE) and Auto Focus (AF). Thus, the image processor 150 processes the image signal output from the camera unit 140 in the unit of a frame, and outputs frame image data adaptively to the features and size of the display unit 160. The image processor 150 includes an image codec, and compresses the frame image data displayed on the display unit 160 in a preset manner or restores the compressed frame image data to the original frame image data. Herein, the image codec may be Joint Picture Experts Group (JPEG) codec, Moving Picture Experts Group 4 (MPEG4) codec, or Wavelet codec. It is assumed that the image processor 150 has an on screen display (OSD) function. The image processor 150 may output OSD data according to the displayed picture size under the control of the controller 110.

The display unit 160 displays an image signal output from the image processor 150 on the screen and displays user data output from the controller 110. Herein, the display unit 160 may be a Liquid Crystal Display (LCD), and in this case, the display unit 160 may include an LCD controller, a memory capable of storing image data, an LCD element, and so on. When the LCD is implemented with a touch screen, it may serve as an input unit. In this case, on the display unit 160, keys such as the key input unit 127 may be displayed.

According to an embodiment of the present invention, when the wireless terminal is unlocked by a particular one of the plurality of passwords, the display unit 160 displays only data stored in a particular-password mode, out of data of a corresponding application.

Hereinafter, a detailed description will be made of an operation of managing an application according to a type of a password in the wireless terminal with reference to FIGS. 2 through 4D.

Figure 2:
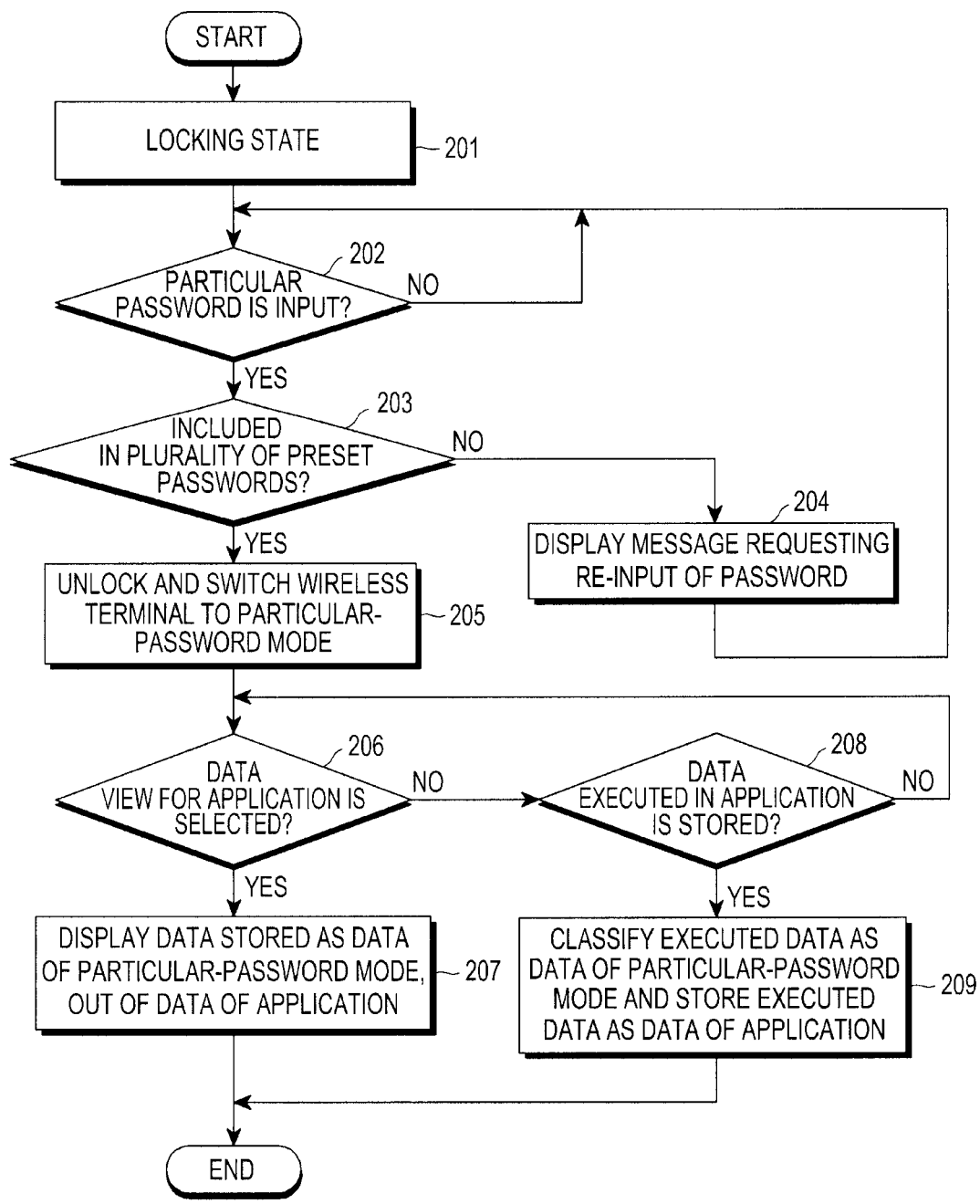
FIG. 2 is a flowchart illustrating a process of managing an application in a wireless terminal according to an embodiment of the present invention.

FIG. 2 is a flowchart illustrating a process of managing an application in a wireless terminal according to an embodiment of the present invention, and FIGS. 3A through 4D are diagrams for describing an operation of managing an application in a wireless terminal according to an embodiment of the present invention.

Herein, the teachings of the present invention will be described in detail with reference to FIGS. 2 through 4D, together with FIG. 1.

Referring to FIG. 2, upon input of a particular password for unlocking the wireless terminal in step 201 from a locking state, the controller 110 senses the input in step 202 and determines whether the input particular password is included in a plurality of preset passwords in step 203.

If determining that the input particular password is not included in the plurality of preset passwords in step 203, the controller 110 displays a message requesting re-input of a password in step 204.

If determining that the input particular password is included in the plurality of preset passwords in step 203, the controller 110 unlocks the wireless terminal and switches the wireless terminal to a particular-password mode corresponding to the input particular password in step 205.

In the particular password mode, if a data view menu for a corresponding application is selected in step 206, the controller 110 extracts data which stores key values of the particular-password mode from data of the corresponding application and displays only the extracted data as the data of the corresponding application on the display unit 160 in step 207.

In the particular-password mode, if a data view is not selected in step 206 and if data executed in a corresponding application is stored in step 208, the controller 110 stores key values of the particular-password mode in the executed data to classify the executed data as the data of the particular-password mode and store the executed data as the data of the corresponding application in step 209.

The process illustrated in FIG. 2 will now be described in more detail with reference to FIGS. 3A through 4D in which a pattern is assumed to be used as a password for unlocking the wireless terminal.

Figure 3A:
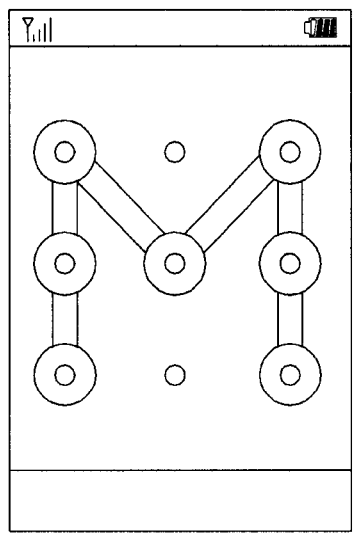
Figure 3B:
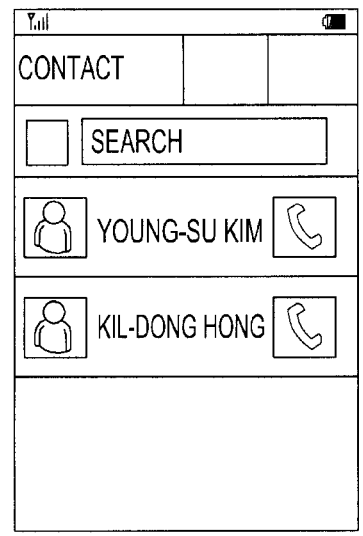

Referring to FIG. 3A, upon input of an "M" shaped pattern, out of a plurality of preset unlocking patterns, the wireless terminal is unlocked and switched to an "M" shaped pattern mode. If an application, such as a phone directory for example, is selected during the "M" shaped pattern mode, only phone number data storing key values of the "M" shaped pattern, out of all phone number data stored in the phone directory, is displayed as illustrated in FIG. 3B. Note that the key values corresponding to the "M" shaped pattern is pre-stored. When new phone number data is stored in the phone directory during the "M" shaped pattern mode, the key values indicating the "M" shaped pattern mode are newly stored, such that the stored new phone number data is classified as data representing the "M" shaped pattern mode for a later retrieval.

Note that the key values corresponding to data are pre-stored in each of the plurality of passwords. Accordingly, as shown in step 207, the data stored as the corresponding key value is extracted and displayed, when the application data corresponding to the particular-password mode is selected.

As shown in step 209, the key values assigned in the particular-password mode are stored, when the data executed in the particular-password mode is stored. And, as shown in step 207, the data stored as the corresponding key value is extracted and displayed, when the application data corresponding to the particular-password mode is selected.

Figure 3C:
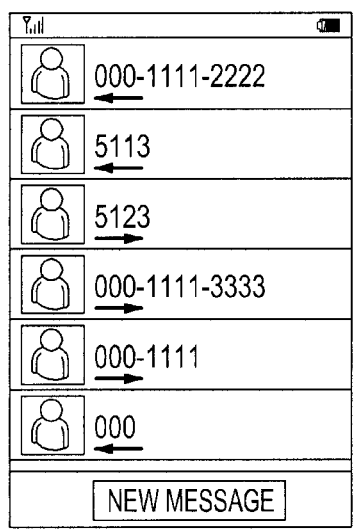

If a message application is selected during the "M" shaped pattern mode, only message data storing the key values of the "M" shaped pattern mode, out of outgoing/incoming messages stored in the message application, is displayed as illustrated in FIG. 3C. Note that the key values corresponding to the "M" shaped pattern is prestored. Also, if reception or transmission of new message data is performed in the "M" shaped pattern mode, the key values of the "M" shaped pattern mode are newly stored, such that the new message data is classified as data representing the "M" shaped pattern mode for a later retrieval.

Figure 3D:
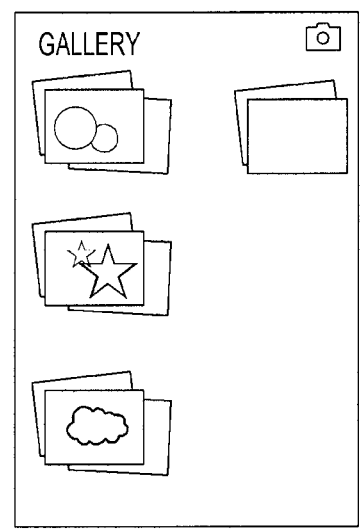

If an album view application is selected in the "M" shaped pattern mode, only image data storing the key values of the "M" shaped pattern mode, out of image data stored in the album view application, is displayed as illustrated in FIG. 3D. Note that the key values corresponding to the "M" shaped pattern is prestored. Further, if storing of a new image due to reception or capturing of the new image is selected in the "M" shaped pattern mode, the key values of the "M" shaped pattern mode are newly stored, such that the new image data is classified as data representing the "M" shaped pattern mode.

Referring to FIG. 4A, upon input of a "V" shaped pattern out of the plurality of preset unlocking patterns, the wireless terminal is unlocked and switched to a "V" shaped pattern mode. If an application, a phone directory for example, is selected during the "V" shaped pattern mode, only phone number data storing key values of the "V" shaped pattern, out of all the phone number data stored in the phone directory, is displayed as illustrated in FIG. 4B. Note that the key values corresponding to the "V" shaped pattern is prestored. Similarly, when new phone number data is stored in the phone directory in the "V" shaped pattern mode, the key values of the "V" shaped pattern mode are newly stored, such that the stored new phone number data is classified as data of the "V" shaped pattern mode for a later retrieval.

If a message application is selected in the "V" shaped pattern mode, only message data storing the key values of the "V" shaped pattern mode, out of outgoing/incoming messages stored in the message application, is displayed as illustrated in FIG. 4C. Note that the key values corresponding to the "V" shaped pattern is prestored. If reception or transmission of new message data is performed in the "V" shaped pattern mode, the key values of the "V" shaped pattern mode are newly stored i, such that the new message data is classified as data of the "V" shaped pattern mode.

Upon selection of an album view application in the "V" shaped pattern mode, if there is no image data storing the key values of the "V" shaped pattern mode, out of image data stored in the album view application, absence of image data is displayed as illustrated in FIG. 4D. If storing of a new image due to reception or capturing of the new image is selected in the "V" shaped pattern mode, the key values of the "V" shaped pattern mode are stored in the new image data, such that the new image data is classified as data of the "V" shaped pattern mode.

As can be appreciated from the foregoing description, by providing an apparatus and method for managing data according to a type of a password in a wireless terminal, even when the wireless terminal is unlocked by a password input by a third party, only data of an application corresponding to a type of the input password is displayed, thereby keeping private information protection.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While a detailed embodiment such as a wireless terminal has been described in the present invention, various changes may be made without departing from the scope of the present invention. Accordingly, the scope of the present invention should be defined by the claims and equivalents thereof, rather than the described embodiment.

What is claimed is:

1. A wireless terminal, comprising:
   a memory for storing a plurality of unlocking patterns and data classified according to each of a plurality of unlocking modes corresponding to a plurality of respective unlocking patterns; and
   a controller configured to display data associated with a particular-unlocking mode corresponding to an inputted unlocking pattern if the inputted unlocking pattern is included in the plurality of unlocking patterns;
   wherein when the wireless terminal is unlocked by the inputted unlocking pattern, the controller switches the wireless terminal to the particular-unlocking mode corresponding to the inputted unlocking pattern and manages data of a plurality of applications according to the particular-unlocking mode, and if a data view is selected during the particular-unlocking mode, the controller displays data containing key values matching the particular-unlocking mode.

2. The wireless terminal of claim 1, wherein the controller classifies data in which the key values of the particular-unlocking mode are stored and displays the classified data.

3. A wireless terminal, comprising:
   a memory for storing a plurality of unlocking patterns and data classified according to each of a plurality of unlocking modes corresponding to a plurality of respective unlocking patterns; and
   a controller configured to display data associated with a particular-unlocking mode corresponding to an inputted unlocking pattern if the inputted unlocking pattern is included in the plurality of unlocking patterns;
   wherein when the wireless terminal is unlocked by the inputted unlocking pattern, the controller switches the wireless terminal to the particular-unlocking mode corresponding to the inputted unlocking pattern and manages data of a plurality of applications according to the particular-unlocking mode. and if data is stored during the particular-unlocking mode using a corresponding application, the controller associates the stored data with the particular-unlocking mode.

4. The wireless terminal of claim 3, wherein the plurality of unlocking patterns comprises predetermined patterns and predetermined numbers for unlocking the wireless terminal.

5. The wireless terminal of claim 3, wherein the controller stores key values of the particular-unlocking mode in the data stored using the corresponding application to classify the stored data as the data of the particular-unlocking mode.

6. The wireless terminal of claim 3, wherein the plurality of unlocking patterns comprise at least one unlocking pattern for classifying and managing user data of each of a plurality of applications, and at least one unlocking pattern for collectively managing user data of each of the plurality of applications.

7. A method for managing an application in a wireless terminal, the method comprising:
   storing a plurality of unlocking patterns and data classified according to each of a plurality of unlocking modes corresponding to a plurality of respective unlocking patterns;
   displaying data associated with a particular-unlocking mode corresponding to an inputted unlocking pattern if the inputted unlocking pattern is included in the plurality of unlocking patterns; and
   classifying and managing data, which comprises:
      when the wireless terminal is unlocked by the inputted unlocking pattern, switching the wireless terminal to the particular-unlocking pattern mode corresponding to the inputted unlocking pattern and manages data of a plurality of applications according to the particular-unlocking mode; and
      if a data view for an application among a plurality of applications is selected during the particular-unlocking mode, displaying data containing key values matching the particular-unlocking mode.

8. The method of claim 7, wherein the displaying of the data comprises:
   extracting data which stores the key values of the particular-unlocking mode from data of a corresponding application and classifying and displaying the extracted data as the data stored in the particular-unlocking mode.

9. A method for managing an application in a wireless terminal, the method comprising:
   storing a plurality of unlocking patterns and data classified according to each of a plurality of unlocking modes corresponding to a plurality of respective unlocking patterns;
   displaying data associated with a particular-unlocking mode corresponding to an inputted unlocking pattern if the inputted unlocking pattern is included in the plurality of unlocking patterns; and
   classifying and managing data according to each of the plurality of unlocking patterns, which comprises:
      when the wireless terminal is unlocked by the inputted unlocking pattern, switching the wireless terminal to the particular-unlocking mode corresponding to the inputted unlocking pattern; and
      if data is stored during the particular-unlocking pattern mode using a corresponding application, associating the stored data with the particular-unlocking pattern mode.

10. The method of claim 9, wherein the plurality of unlocking patterns comprises predetermined patterns and predetermined numbers for unlocking the wireless terminal.

11. The method of claim 9, wherein the storing of the data comprises storing key values of the particular-unlocking mode in the data stored using the corresponding application to classify the stored data as the data of the particular-unlocking mode.

12. The method of claim 9, wherein the plurality of unlocking patterns comprise at least one unlocking pattern for classifying and managing data of each of a plurality of applications, and at least one unlocking pattern for collectively managing data of each of the plurality of applications.

* * * * *

UNITED STATES PATENT AND TRADEMARK OFFICE
CERTIFICATE OF CORRECTION

PATENT NO.        : 8,886,165 B2
APPLICATION NO.   : 13/404806
DATED             : November 11, 2014
INVENTOR(S)       : Se-Hong Kwon et al.

It is certified that error appears in the above-identified patent and that said Letters Patent is hereby corrected as shown below:

IN THE CLAIMS:

Column 8, Claim 9, Lines 23-24 should read as follows:
--...during the particular-unlocking mode...--

Column 8, Claim 9, Line 25 should read as follows:
--...with the particular-unlocking mode...--

Signed and Sealed this
Third Day of March, 2015

Michelle K. Lee
*Deputy Director of the United States Patent and Trademark Office*